United States Patent
Kim et al.

(10) Patent No.: US 12,112,747 B2
(45) Date of Patent: Oct. 8, 2024

(54) METHOD FOR CONTROLLING EXTERNAL DEVICE BASED ON VOICE AND ELECTRONIC DEVICE THEREOF

(71) Applicant: Samsung Electronics Co., Ltd., Suwon-si (KR)

(72) Inventors: Hyeonjeong Kim, Suwon-si (KR); Soyoung Kim, Suwon-si (KR); Taegu Kim, Suwon-si (KR); Yoonju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 17/535,831

(22) Filed: Nov. 26, 2021

(65) Prior Publication Data
US 2022/0180870 A1  Jun. 9, 2022

Related U.S. Application Data

(63) Continuation of application No. PCT/KR2021/017243, filed on Nov. 23, 2021.

(30) Foreign Application Priority Data

Dec. 4, 2020  (KR) .................. 10-2020-0168086

(51) Int. Cl.
*G10L 15/22*  (2006.01)
*G06F 3/16*  (2006.01)

(52) U.S. Cl.
CPC .............. *G10L 15/22* (2013.01); *G06F 3/167* (2013.01); *G10L 2015/223* (2013.01)

(58) Field of Classification Search
CPC .... G10L 15/22; G10L 2015/223; G06F 3/167
See application file for complete search history.

(56) References Cited

U.S. PATENT DOCUMENTS 8,363,009 B1 * 1/2013 Queru ................. G06F 3/04883
  345/173
9,160,786 B1 * 10/2015 Jackson ................ H04L 67/06
(Continued)

FOREIGN PATENT DOCUMENTS

KR  10-2005-0005871 A  1/2005
KR  10-2010-0109499 A  10/2010
(Continued)

OTHER PUBLICATIONS

International Search Report dated Mar. 16, 2022, issued in International Application No. PCT/KR2021/017243.

*Primary Examiner* — Sonia L Gay
(74) *Attorney, Agent, or Firm* — Jefferson IP Law, LLP

(57) ABSTRACT

An electronic device is provided. The electronic device includes a voice input device, a communication circuit, a display, a processor operatively connected to the voice input device, the communication circuit, and the display, and a memory operatively connected to the processor. The memory may store one or more instructions that, when executed, cause the processor to receive a first utterance from a first user through the voice input device, to communicatively connect to a first external electronic device based on the first utterance, to display, to the display, a first user interface indicating a state of communicatively connecting to the first external electronic device, and to display, to the display, a second user interface indicating that the electronic device and the second external electronic device are simultaneously connected to the first external electronic device when the first external electronic device is communicatively connected to a second external electronic device.

21 Claims, 10 Drawing Sheets

(56) References Cited

U.S. PATENT DOCUMENTS

| | | | |
|---|---|---|---|
| 10,504,513 | B1 | 12/2019 | Gray et al. |
| 10,839,806 | B2 | 11/2020 | Jeon et al. |
| 11,145,303 | B2 | 10/2021 | Kwon |
| 11,495,222 | B2 | 11/2022 | Han et al. |
| 2009/0076821 | A1* | 3/2009 | Brenner .................. G06F 16/64 707/999.001 |
| 2010/0246571 | A1 | 9/2010 | Geppert et al. |
| 2010/0246800 | A1 | 9/2010 | Geppert et al. |
| 2010/0251142 | A1 | 9/2010 | Geppert et al. |
| 2015/0121214 | A1* | 4/2015 | Roberts .............. H04N 21/4661 715/705 |
| 2015/0161360 | A1* | 6/2015 | Paruchuri .......... H04N 21/2743 726/27 |
| 2017/0093943 | A1* | 3/2017 | Alsina ................. H04L 67/1095 |
| 2019/0013024 | A1 | 1/2019 | Jeon et al. |
| 2019/0132265 | A1 | 5/2019 | Przygodzki et al. |
| 2020/0302313 | A1 | 9/2020 | Jeong |
| 2021/0065716 | A1 | 3/2021 | Jeon et al. |
| 2021/0151052 | A1 | 5/2021 | Kang et al. |
| 2021/0176204 | A1 | 6/2021 | Geppert et al. |
| 2021/0357172 | A1* | 11/2021 | Sinesio .................. G06F 16/48 |

FOREIGN PATENT DOCUMENTS

| | | |
|---|---|---|
| KR | 10-2013-0100448 A | 9/2013 |
| KR | 10-2018-0052112 A | 5/2018 |
| KR | 10-2019-0006403 A | 1/2019 |
| KR | 2019-0074012 A | 6/2019 |
| KR | 10-2019-0114321 A | 10/2019 |
| KR | 10-2019-0130376 A | 11/2019 |
| KR | 10-2020-0015616 A | 2/2020 |
| WO | 2019/124742 A1 | 6/2019 |

* cited by examiner

METHOD FOR CONTROLLING EXTERNAL DEVICE BASED ON VOICE AND ELECTRONIC DEVICE THEREOF

CROSS-REFERENCE TO RELATED APPLICATION(S)

This application is a continuation application, claiming the benefit priority under § 365(c), of an International application No. PCT/KR2021/017243, filed on Nov. 23, 2020, which is based on and claimed priority of a Korean patent application number 10-2020-0168086, filed on Dec. 4, 2020, in the Korean Intellectual Property Office, the disclosure of which is incorporated by reference herein in its entirety.

TECHNICAL FIELD

The disclosure relates to a method for controlling an external device based on voice, and an electronic device thereof.

BACKGROUND ART

As the number and types of electronic devices that support Internet connections increase, an electronic device may receive a user input (e.g., a voice input) through a voice assistant and then may control other electronic devices based on the voice input.

In a case of a voice assistant of the related art in a multi-user environment, it is assumed that a plurality of users share one smart device, and each user and a voice assistant of a smart device have a one-to-one conversational relationship. For example, a second user may also give a command to a voice assistant of a smart speaker by using a smart speaker registered with a first user's account. However, the second user does not participate in a dialogue session of the first user, and each user has a conversation independently with the voice assistant of the smart speaker.

It is assumed that one user utilizes a listener device and an executor device even when a command is delivered to the executor device through the listener device. When the second user transmits a command to the executor device through another listener device while the first user controls the executor device through the listener device, a voice assistant of the executor device ends a previous dialogue session and then executes a new independent dialogue session. For example, the first user and the second user do not continue a conversation while participating in the same dialogue session at the same time.

The above information is presented as background information only to assist with an understanding of the disclosure. No determination has been made, and no assertion is made, as to whether any of the above might be applicable as prior art with regard to the disclosure.

DISCLOSURE

Technical Problem

In accordance with an electronic device according to various embodiments disclosed in the specification, it is possible to provide an extended experience in a voice assistant by allowing a plurality of users to participate in one dialogue session and to control the same executor device.

Aspects of the disclosure are to address at least the above-mentioned problems and/or disadvantages and to provide at least the advantages described below. Accordingly, an aspect of the disclosure is to provide an improved method for controlling an electronic device based on a voice command, and an electronic device thereof.

Technical Solution

Additional aspects will be set forth in part in the description which follows and, in part, will be apparent from the description, or may be learned by practice of the presented embodiments.

In accordance with an aspect of the disclosure, an electronic device is provided. The electronic device includes a voice input device, a communication circuit, a display, a processor operatively connected to the voice input device, the communication circuit, and the display, and a memory operatively connected to the processor. The memory may store one or more instructions that, when executed, cause the processor to receive a first utterance from a first user through the voice input device, to communicatively connect to a first external electronic device based on the first utterance, to display, to the display, a first user interface indicating a state of communicatively connecting to the first external electronic device, and to display, to the display, a second user interface indicating that the electronic device and the second external electronic device are simultaneously connected to the first external electronic device when the first external electronic device is communicatively connected to a second external electronic device.

In accordance with another aspect of the disclosure, a method for controlling an external electronic device based on voice is provided. The method includes receiving a first utterance from a first user through a voice input device of an electronic device, communicatively connecting to a first external electronic device based on the first utterance, displaying, to a display of the electronic device, a first user interface indicating a state of communicatively connecting to the first external electronic device, and displaying, to the display, a second user interface indicating that the electronic device and the second external electronic device are simultaneously connected to the first external electronic device when the first external electronic device is communicatively connected to a second external electronic device.

Advantageous Effects

According to various embodiments disclosed in this specification, in a multi-device environment, it may provide an improved method for controlling an electronic device based on a voice command.

According to various embodiments of the disclosure, it is possible to provide an electronic device that provides an extended experience in a voice assistant by allowing a plurality of users to participate in one dialogue session and to control the same executor device, and a control method thereof.

Besides, a variety of effects directly or indirectly understood through the specification may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR DISCLOSURE

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
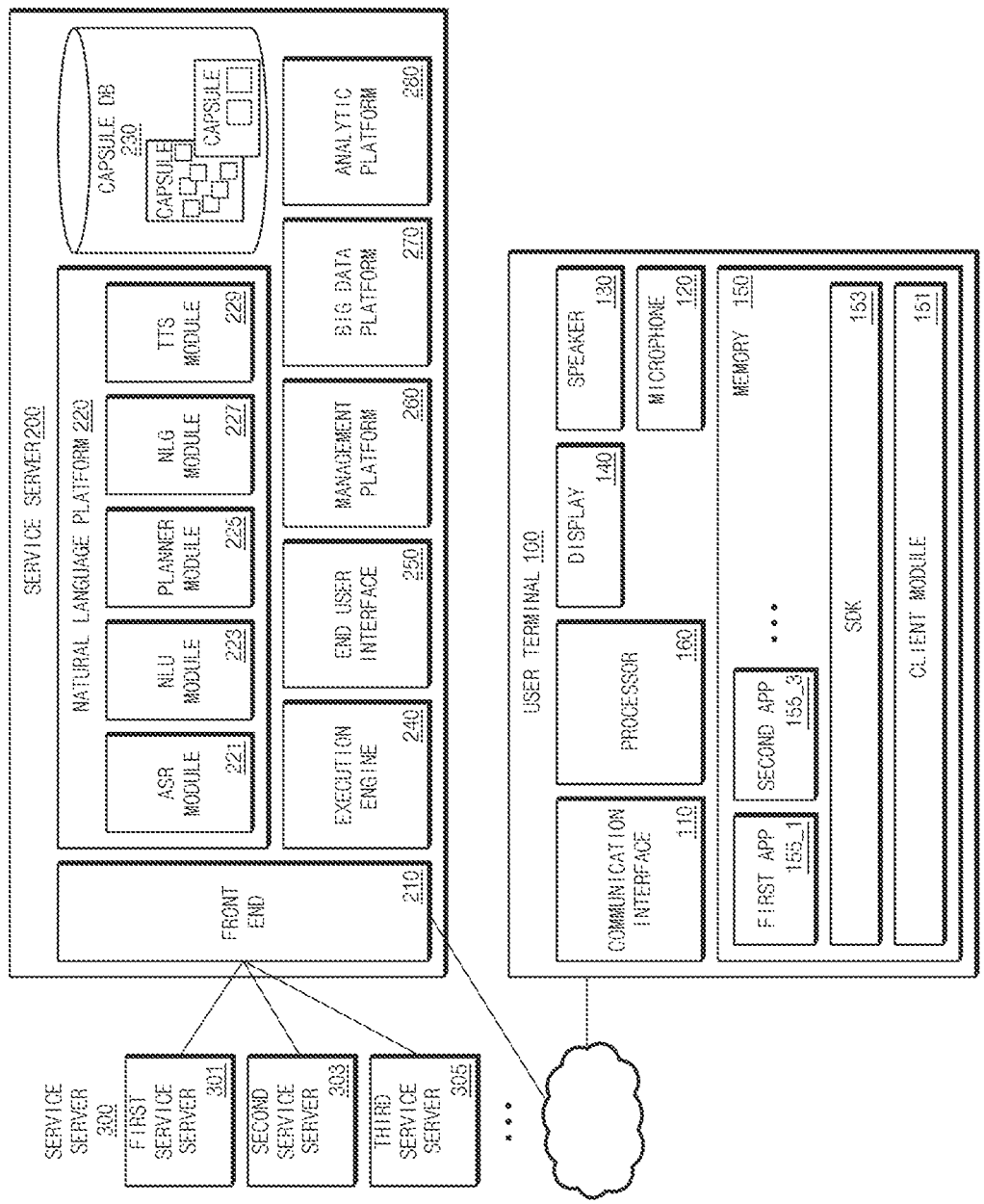
FIG. 1 is a block diagram illustrating an integrated intelligence system according to an embodiment of the disclosure.

FIG. 1 is a block diagram illustrating an integrated intelligence system according to an embodiment of the disclosure.

Referring to FIG. 1, an integrated intelligence system according to an embodiment may include a user terminal 100, an intelligence server 200, and a service server 300.

The user terminal 100 according to an embodiment may be a terminal device (or an electronic device) capable of connecting to Internet, and may be, for example, a mobile phone, a smartphone, a personal digital assistant (PDA), a notebook computer, a television (TV), a household appliance, a wearable device, a head mounted display (HMD), or a smart speaker.

According to the illustrated embodiment of the disclosure, the user terminal 100 may include a communication interface 110, a microphone 120, a speaker 130, a display 140, a memory 150, or a processor 160. The listed components may be operatively or electrically connected to one another.

The communication interface 110 according to an embodiment may be connected to an external device and may be configured to transmit or receive data to or from the external device. The microphone 120 according to an embodiment may receive a sound (e.g., a user utterance) to convert the sound into an electrical signal. The speaker 130 according to an embodiment may output the electrical signal as sound (e.g., voice). The display 140 according to an embodiment may be configured to display an image or a video. The display 140 according to an embodiment may display the graphic user interface (GUI) of the running app (or an application program).

The memory 150 according to an embodiment may store a client module 151, a software development kit (SDK) 153, and a plurality of apps. The client module 151 and the SDK 153 may constitute a framework (or a solution program) for performing general-purposed functions. Furthermore, the client module 151 or the SDK 153 may constitute the framework for processing a voice input.

The plurality of apps may be programs for performing a specified function. According to an embodiment, the plurality of apps may include a first app 155_1 and/or a second app 155_3. According to an embodiment, each of the plurality of apps may include a plurality of actions for performing a specified function. For example, the apps may include an alarm app, a message app, and/or a schedule app. According to an embodiment, the plurality of apps may be executed by the processor 160 to sequentially execute at least part of the plurality of actions.

According to an embodiment, the processor 160 may control overall operations of the user terminal 100. For example, the processor 160 may be electrically connected to the communication interface 110, the microphone 120, the speaker 130, and the display 140 to perform a specified operation. For example, the processor 160 may include at least one processor.

Moreover, the processor 160 according to an embodiment may execute the program stored in the memory 150 so as to perform a specified function. For example, according to an embodiment, the processor 160 may execute at least one of the client module 151 or the SDK 153 so as to perform a following operation for processing a voice input. The processor 160 may control operations of the plurality of apps via the SDK 153. The following actions described as the actions of the client module 151 or the SDK 153 may be the actions performed by the execution of the processor 160.

According to an embodiment, the client module 151 may receive a voice input. For example, the client module 151 may receive a voice signal corresponding to a user utterance detected through the microphone 120. The client module 151 may transmit the received voice input (e.g., a voice input) to the intelligence server 200. The client module 151 may transmit state information of the user terminal 100 to the intelligence server 200 together with the received voice input. For example, the state information may be execution state information of an app.

According to an embodiment, the client module 151 may receive a result corresponding to the received voice input. For example, when the intelligence server 200 is capable of calculating the result corresponding to the received voice input, the client module 151 may receive the result corresponding to the received voice input. The client module 151 may display the received result on the display 140.

According to an embodiment, the client module 151 may receive a plan corresponding to the received voice input. The client module 151 may display, on the display 140, a result of executing a plurality of actions of an app depending on the plan. For example, the client module 151 may sequentially display the result of executing the plurality of actions on a display. For another example, the user terminal 100 may display only a part of results (e.g., a result of the last action) of executing the plurality of actions, on the display.

According to an embodiment, the client module 151 may receive a request for obtaining information necessary to calculate the result corresponding to a voice input, from the intelligence server 200. According to an embodiment, the client module 151 may transmit the necessary information to the intelligence server 200 in response to the request.

According to an embodiment, the client module 151 may transmit, to the intelligence server 200, information about the result of executing a plurality of actions depending on the plan. The intelligence server 200 may identify that the received voice input is correctly processed, using the result information.

According to an embodiment, the client module 151 may include a speech recognition module. According to an embodiment, the client module 151 may recognize a voice input for performing a limited function, via the speech recognition module. For example, the client module 151 may launch an intelligence app for processing a specific voice input by performing an organic action, in response to a specified voice input (e.g., wake up!).

According to an embodiment, the intelligence server 200 may receive information associated with a user's voice input from the user terminal 100 over a communication network. According to an embodiment, the intelligence server 200 may convert data associated with the received voice input to text data. According to an embodiment, the intelligence server 200 may generate at least one plan for performing a task corresponding to the user's voice input, based on the text data.

According to an embodiment, the plan may be generated by an artificial intelligent (AI) system. The AI system may be a rule-based system, or may be a neural network-based system (e.g., a feedforward neural network (FNN) and/or a recurrent neural network (RNN)). Alternatively, the AI system may be a combination of the above-described systems or an AI system different from the above-described system. According to an embodiment, the plan may be selected from a set of predefined plans or may be generated in real time in response to a user's request. For example, the AI system may select at least one plan of the plurality of predefined plans.

According to an embodiment, the intelligence server 200 may transmit a result according to the generated plan to the user terminal 100 or may transmit the generated plan to the user terminal 100. According to an embodiment, the user terminal 100 may display the result according to the plan, on a display. According to an embodiment, the user terminal 100 may display a result of executing the action according to the plan, on the display.

The intelligence server 200 according to an embodiment may include a front end 210, a natural language platform 220, a capsule database 230, an execution engine 240, an end user interface 250, a management platform 260, a big data platform 270, or an analytic platform 280.

According to an embodiment, the front end 210 may receive a voice input received from the user terminal 100. The front end 210 may transmit a response corresponding to the voice input to the user terminal 100.

According to an embodiment, the natural language platform 220 may include an automatic speech recognition (ASR) module 221, a natural language understanding (NLU) module 223, a planner module 225, a natural language generator (NLG) module 227, and/or a text to speech module (TTS) module 229.

According to an embodiment, the ASR module 221 may convert the voice input received from the user terminal 100 into text data. According to an embodiment, the NLU module 223 may grasp the intent of the user, using the text data of the voice input. For example, the NLU module 223 may grasp the intent of the user by performing syntactic analysis or semantic analysis. According to an embodiment, the NLU module 223 may grasp the meaning of words extracted from the voice input by using linguistic features (e.g., syntactic elements), such as morphemes or phrases and may determine the intent of the user by matching the grasped meaning of the words to the intent.

According to an embodiment, the planner module 225 may generate the plan by using a parameter and the intent that is determined by the NLU module 223. According to an embodiment, the planner module 225 may determine a plurality of domains necessary to perform a task, based on the determined intent. The planner module 225 may determine a plurality of actions included in each of the plurality of domains determined based on the intent. According to an embodiment, the planner module 225 may determine the parameter necessary to perform the determined plurality of actions or a result value output by the execution of the plurality of actions. The parameter and the result value may be defined as a concept of a specified form (or class). As such, the plan may include the plurality of actions and/or a plurality of concepts, which are determined by the intent of the user. The planner module 225 may determine the relationship between the plurality of actions and the plurality of concepts stepwise (or hierarchically). For example, the planner module 225 may determine the execution sequence of the plurality of actions, which are determined based on the user's intent, based on the plurality of concepts. In other words, the planner module 225 may determine an execution sequence of the plurality of actions, based on the parameters necessary to perform the plurality of actions and the result output by the execution of the plurality of actions. Accordingly, the planner module 225 may generate a plan including information (e.g., ontology) about the relationship between the plurality of actions and the plurality of concepts. The planner module 225 may generate the plan, using information stored in the capsule DB 230 storing a set of relationships between concepts and actions.

According to an embodiment, the NLG module 227 may change specified information into information in a text form. The information changed to the text form may be in the form of a natural language speech. The TTS module 229 according to an embodiment may change information in the text form to information in a voice form.

According to an embodiment, all or part of the functions of the natural language platform 220 may be also implemented in the user terminal 100.

The capsule DB 230 may store information about the relationship between the actions and the plurality of concepts corresponding to a plurality of domains. According to an embodiment, the capsule may include a plurality of action objects (or action information) and concept objects (or concept information) included in the plan. According to an embodiment, the capsule DB 230 may store the plurality of capsules in a form of a concept action network (CAN). According to an embodiment, the plurality of capsules may be stored in the function registry included in the capsule DB 230.

The capsule DB 230 may include a strategy registry that stores strategy information necessary to determine a plan corresponding to a voice input. When there are a plurality of plans corresponding to the voice input, the strategy information may include reference information for determining one plan. According to an embodiment, the capsule DB 230 may include a follow-up registry that stores information of the follow-up action for suggesting a follow-up action to the user in a specified context. For example, the follow-up action may include a follow-up utterance. According to an embodiment, the capsule DB 230 may include a layout registry storing layout information of information output via the user terminal 100. According to an embodiment, the capsule DB 230 may include a vocabulary registry storing vocabulary information included in capsule information. According to an embodiment, the capsule DB 230 may include a dialog registry storing information about dialog (or interaction) with the user. The capsule DB 230 may update an object stored via a developer tool. For example, the developer tool may include a function editor for updating an action object or a concept object. The developer tool may include a vocabulary editor for updating a vocabulary. The developer tool may include a strategy editor that generates and registers a strategy for determining the plan. The developer tool may include a dialog editor that creates a dialog with the user. The developer tool may include a follow-up editor capable of activating a follow-up target and editing the follow-up utterance for providing a hint. The follow-up target may be determined based on a target, the user's preference, or an environment condition, which is currently set. The capsule DB 230 according to an embodiment may be also implemented in the user terminal 100.

According to an embodiment, the execution engine 240 may calculate a result by using the generated plan. The end user interface 250 may transmit the calculated result to the user terminal 100. Accordingly, the user terminal 100 may receive the result and may provide the user with the received result. According to an embodiment, the management platform 260 may manage information used by the intelligence server 200. According to an embodiment, the big data platform 270 may collect data of the user. According to an embodiment, the analytic platform 280 may manage quality of service (QoS) of the intelligence server 200. For example, the analytic platform 280 may manage the component and processing speed (or efficiency) of the intelligence server 200.

According to an embodiment, the service server 300 may provide the user terminal 100 with a specified service (e.g., ordering food or booking a hotel). According to an embodiment, the service server 300 may be a server operated by the third party. According to an embodiment, the service server 300 may provide the intelligence server 200 with information for generating a plan corresponding to the received voice input. The provided information may be stored in the capsule DB 230. Furthermore, the service server 300 may provide the intelligence server 200 with result information according to the plan.

In the above-described integrated intelligence system, the user terminal 100 may provide the user with various intelligent services in response to a user input. The user input may include, for example, an input through a physical button, a touch input, or a voice input.

According to an embodiment, the user terminal 100 may provide a speech recognition service via an intelligence app (or a speech recognition app) stored therein. In this case, for example, the user terminal 100 may recognize a user utterance or a voice input, which is received via the microphone, and may provide the user with a service corresponding to the recognized voice input.

According to an embodiment, the user terminal 100 may perform a specified action, based on the received voice input, independently, or together with the intelligence server and/or the service server. For example, the user terminal 100 may launch an app corresponding to the received voice input and may perform the specified action via the executed app.

According to an embodiment, when providing a service together with the intelligence server 200 and/or the service server, the user terminal 100 may detect a user utterance by using the microphone 120 and may generate a signal (or voice data) corresponding to the detected user utterance. The user terminal may transmit the voice data to the intelligence server 200 by using the communication interface 110.

According to an embodiment, the intelligence server 200 may generate a plan for performing a task corresponding to the voice input or the result of performing an action depending on the plan, as a response to the voice input received from the user terminal 100. For example, the plan may include a plurality of actions for performing the task corresponding to the voice input of the user and/or a plurality of concepts associated with the plurality of actions. The concept may define a parameter to be input upon executing the plurality of actions or a result value output by the execution of the plurality of actions. The plan may include relationship information between the plurality of actions and/or the plurality of concepts.

According to an embodiment, the user terminal 100 may receive the response by using the communication interface 110. The user terminal 100 may output the voice signal generated in the user terminal 100 to the outside by using the speaker 130 or may output an image generated in the user terminal 100 to the outside by using the display 140.

Figure 2:
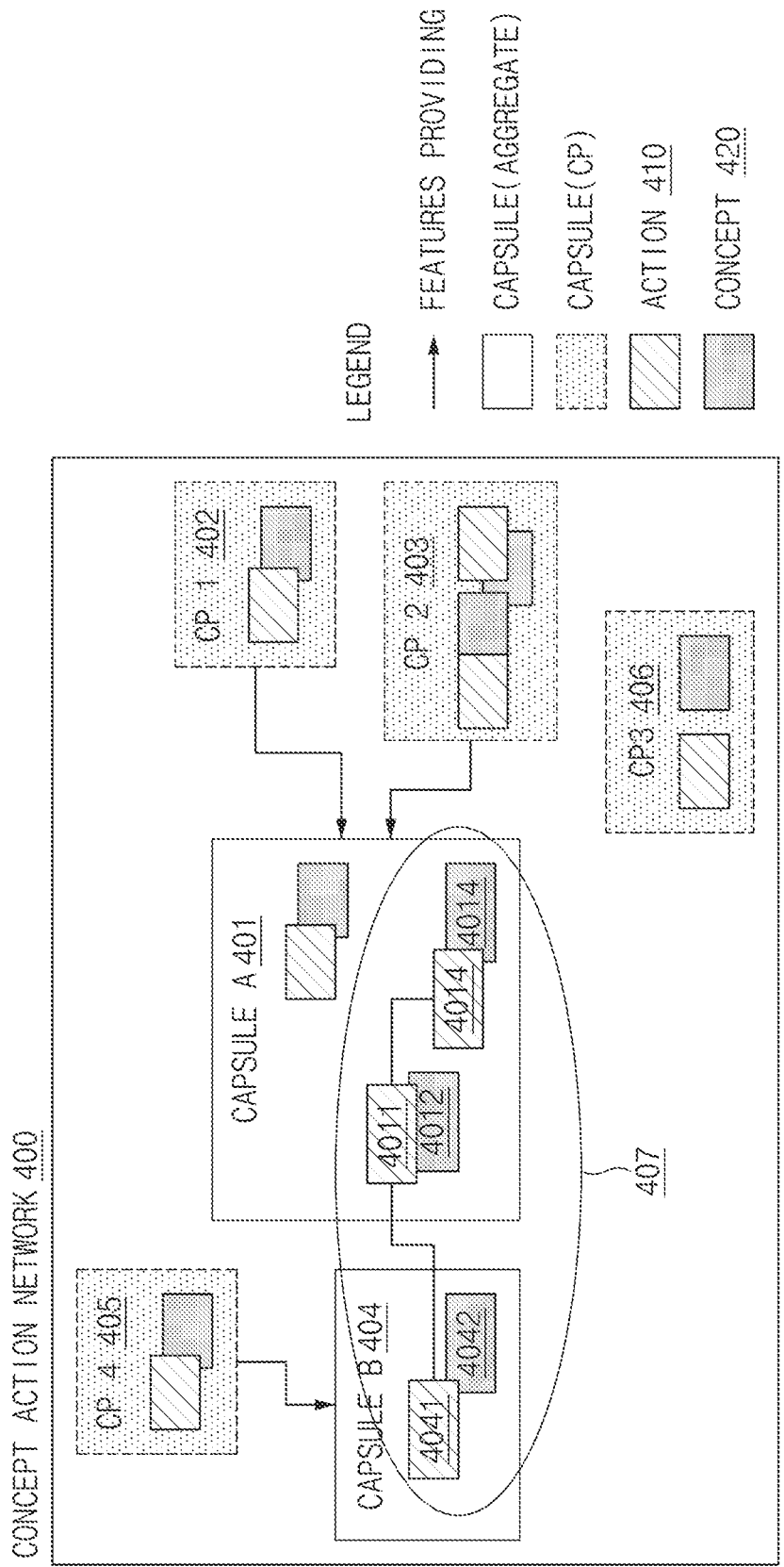
FIG. 2 is a diagram illustrating a form in which relationship information between a concept and an action is stored in a database according to an embodiment of the disclosure.

FIG. 2 is a diagram illustrating a form in which relationship information between a concept and an action is stored in a database according to an embodiment of the disclosure. For example, a database of FIG. 2 may be referred to as a "concept action network" 400.

A capsule database (e.g., the capsule DB 230) of the intelligence server 200 may store a capsule in the form of a CAN. The capsule DB may store an action for processing a task corresponding to a user's voice input and a parameter necessary for the action, in the CAN form.

The capsule DB may store a plurality capsules (a capsule A 401 and a capsule B 404) respectively corresponding to a plurality of domains (e.g., applications). According to an embodiment, a single capsule (e.g., the capsule A 401) may correspond to a single domain (e.g., a location (geo) or an application). Furthermore, at least one service provider (e.g., CP 1 402 or CP 2 403 or CP 1 405 or CP 2 406) for performing a function for a domain associated with the capsule may correspond to one capsule. According to an embodiment, the single capsule may include at least one or more actions 410 and at least one or more concepts 420 for performing a specified function.

The natural language platform 220 may generate a plan for performing a task corresponding to the received voice input, using the capsule stored in a capsule database. For example, the planner module 225 of the natural language platform may generate the plan by using the capsule stored in the capsule database. For example, a plan 407 may be generated by using actions 4011 and 4013 and concepts 4012 and 4014 of the capsule A 401 and an action 4041 and a concept 4042 of the capsule B 404.

Figure 3:
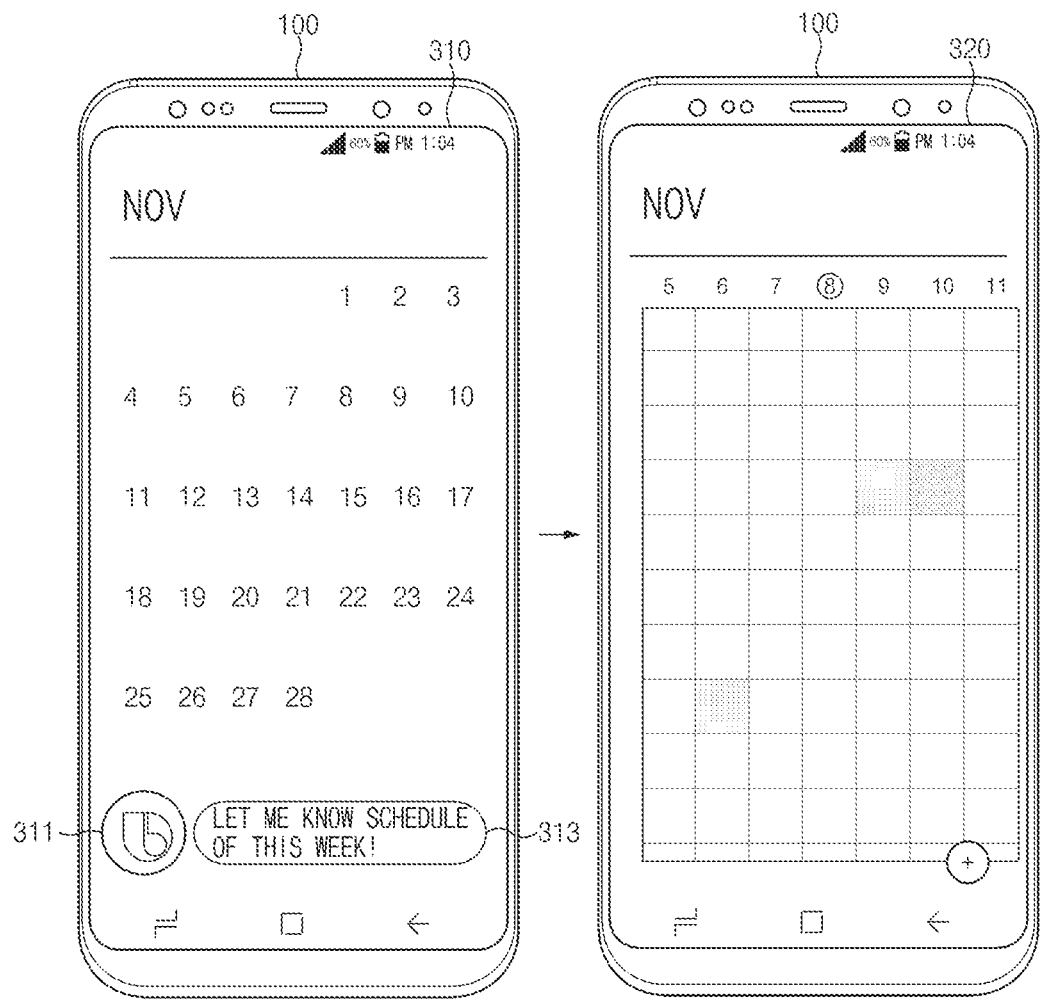
FIG. 3 is a view illustrating a user terminal displaying a screen of processing a voice input received through an intelligence app according to an embodiment of the disclosure.

FIG. 3 is a view illustrating a screen in which a user terminal processes a voice input received through an intelligence app according to an embodiment of the disclosure.

The user terminal 100 may execute an intelligence app to process a user input through the intelligence server 200.

Referring to FIG. 3, according to an embodiment, on screen 310, when recognizing a specified voice input (e.g., wake up!) or receiving an input via a hardware key (e.g., a dedicated hardware key), the user terminal 100 may launch an intelligence app for processing a voice input. For example, the user terminal 100 may launch the intelligence app in a state where a schedule app is executed. According to an embodiment, the user terminal 100 may display an object (e.g., an icon) 311 corresponding to the intelligence app, on the display 140. According to an embodiment, the user terminal 100 may receive a voice input by a user utterance. For example, the user terminal 100 may receive a voice input saying that "let me know the schedule of this week!". According to an embodiment, the user terminal 100 may display a user interface (UI) 313 (e.g., an input window) of the intelligence app, in which text data of the received voice input is displayed, on a display.

According to an embodiment, on screen 320, the user terminal 100 may display a result corresponding to the received voice input, on the display. For example, the user terminal 100 may receive the plan corresponding to the received user input and may display 'the schedule of this week' on the display depending on the plan.

Hereinafter, operations of electronic devices according to an embodiment will be described with reference to FIGS. 4 and 5.

Figure 4:
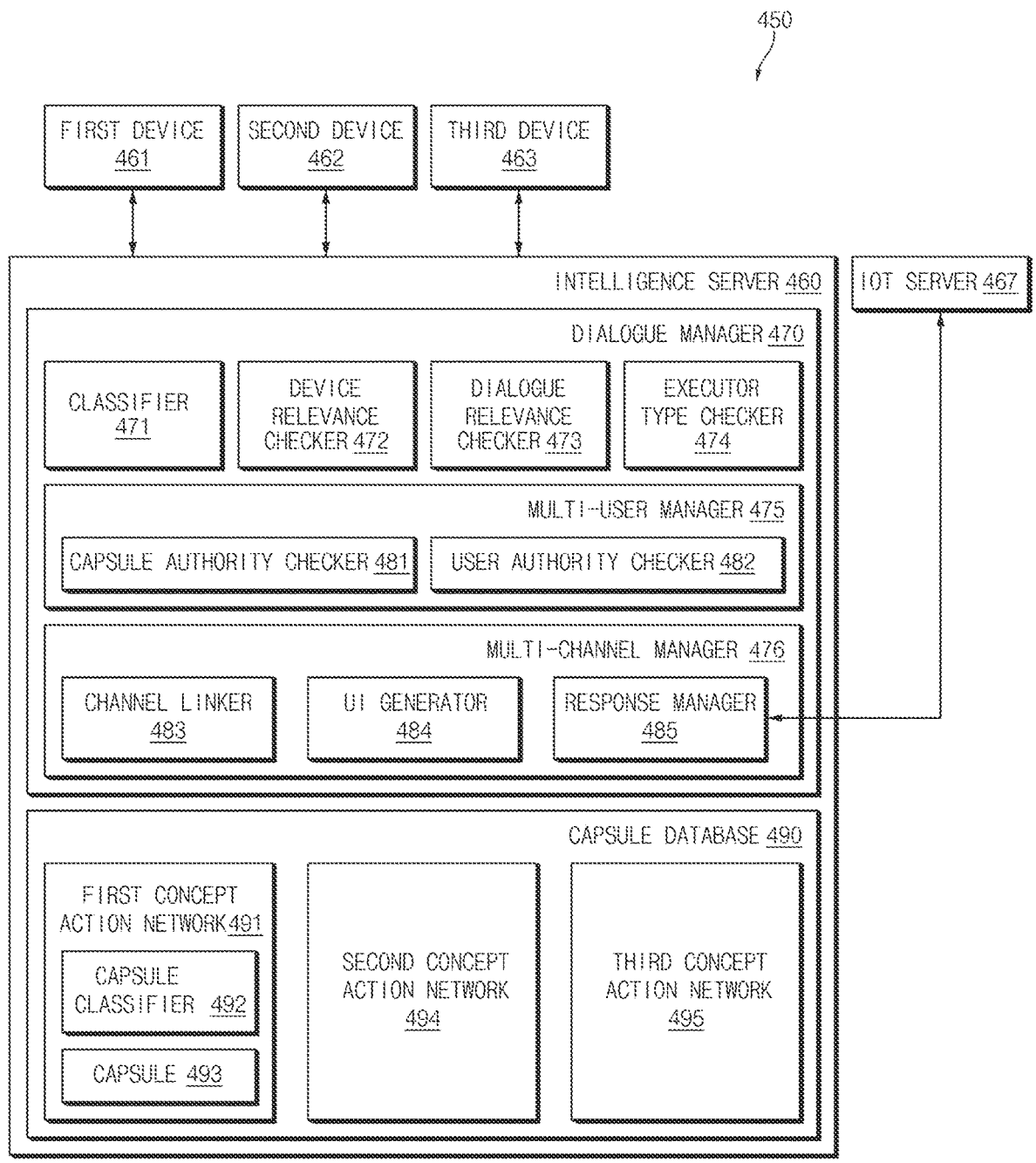
FIG. 4 is a block diagram illustrating an integrated intelligence system according to an embodiment of the disclosure.
Figure 5:
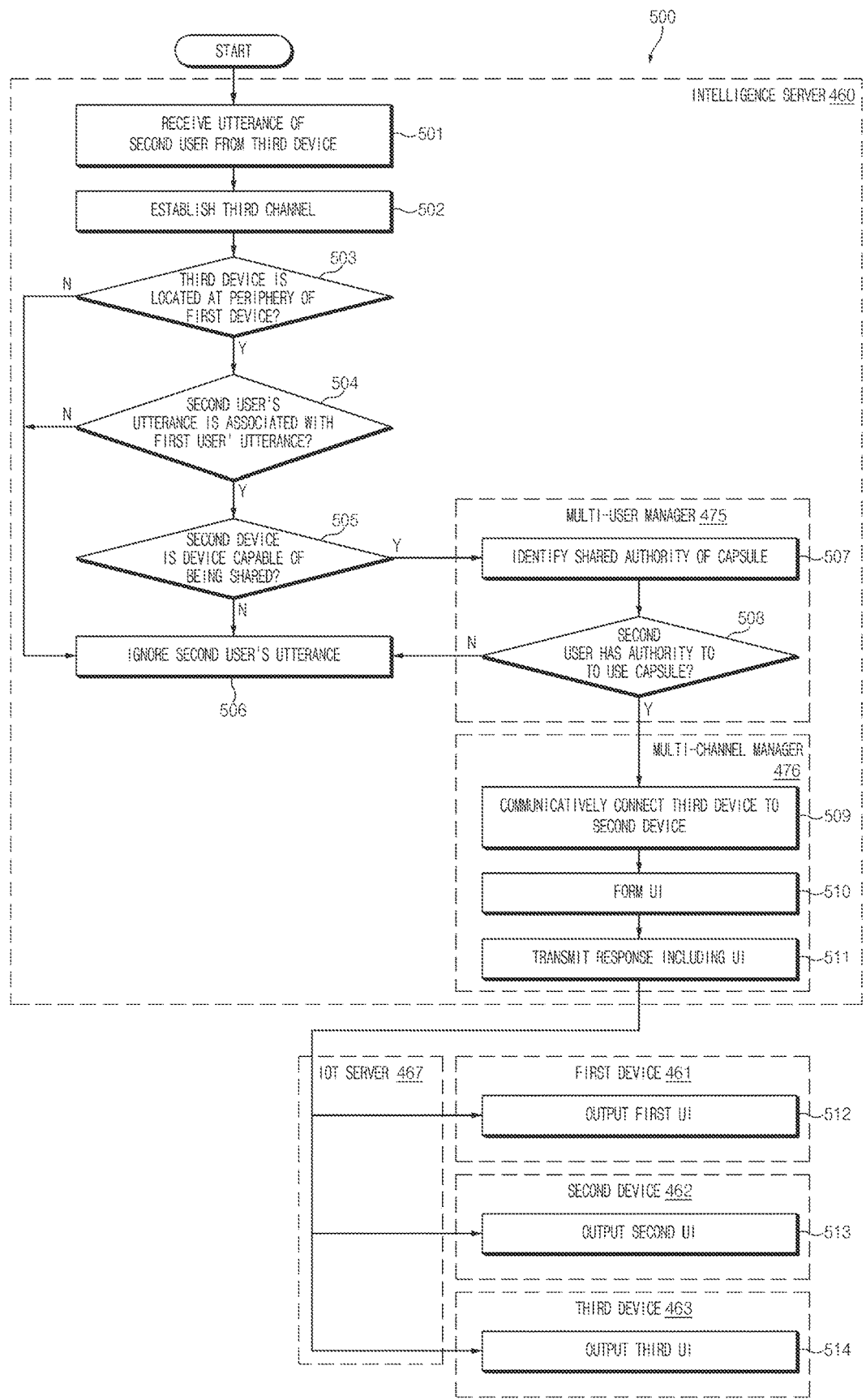
FIG. 5 is a flowchart illustrating an operation of an intelligence server according to an embodiment of the disclosure.

FIG. 4 is a block diagram 450 illustrating an integrated intelligence system according to an embodiment. FIG. 5 is a flowchart 500 illustrating an operation of an intelligence server according to an embodiment.

Referring to FIG. 4, various electronic devices may communicate over a network (e.g., Internet). For example, the network environment may include an intelligence server 460, a first device 461, a second device 462, a third device 463, and an Internet of things (IoT) server 467.

According to an embodiment, the intelligence server 460 may correspond to the intelligence server 200 of FIG. 1. According to an embodiment, the intelligence server 460 may include a dialogue manager 470 and a capsule database 490.

According to an embodiment, the dialogue manager 470 may include a classifier 471, a device relevance checker 472, a dialogue relevance checker 473, an executor type checker 474, a multi-user manager 475, and a multi-channel manager 476. Each of configurations will be described later with reference to FIG. 5.

According to an embodiment, the capsule database 490 may correspond to the capsule DB 230 of FIG. 1. According to an embodiment, the capsule database 490 may include at least one concept action network. For example, the capsule database 490 may include a first concept action network 491, a second concept action network 494, and a third concept action network 495 corresponding to domains, respectively. The description of each concept action network may be the same as that described above with reference to FIG. 2.

According to an embodiment, the IoT server 467 may be a server that stores information (e.g., account information, type information of an electronic device, a name of the electronic device, and/or location information of the electronic device) of various electronic devices supporting Internet connection.

According to an embodiment, each of the first device 461, the second device 462, and the third device 463 may correspond to the user terminal 100 of FIG. 1 and may include a voice agent capable of processing a voice command. For example, each of the first device 461 and/or the third device 463 may correspond to the user terminal 100 of FIG. 1. The second device 462 may be an electronic device configured to be controlled based on a signal from the intelligence server 460, the IoT server 467, the first device 461, and/or the third device 463.

According to an embodiment, each of the first device 461, the second device 462, and the third device 463 may be a listener device or an executor device. According to an embodiment, when an utterance of a first user is entered through a voice input device (e.g., a microphone) of the first device 461, the first device 461 may be a listener device. Furthermore, according to an embodiment, when a device performing a result of processing the utterance, which is entered through the first device 461, through the intelligence server 460 is the second device 462, the second device 462 may be an executor device.

For example, when the utterance of the first user is entered through a voice input device (e.g., a microphone) of the first device 461, the first device 461 may transmit the first user's utterance to the intelligence server 460. At this time, the intelligence server 460 may establish a first channel with the first device 461. The intelligence server 460 may determine an executor device as the second device 462 by analyzing the received utterance of the first user through the classifier 471. According to an embodiment, the classifier 471 may correspond to the natural language platform 220 of FIG. 1. The intelligence server 460 may establish a second channel with the second device 462 determined as an executor device, may transmit a result of processing an utterance entered through the first device 461 to the second device 462 during a specific time by connecting the second channel to the first channel, and may allow the second device 462 to be executed.

Hereinafter, when an utterance of the second user is entered through the third device 463 while the first device 461, which is a listener device, communicates with the intelligence server 460 through the first channel and the second device 462, which is an executor device, communicates with the intelligence server 460 through the second channel, operations of electronic devices in a network environment are described with reference to FIGS. 4 and 5.

According to an embodiment, in operation 501, the intelligence server 460 may receive an utterance of the second user entered through a voice input device (e.g., a microphone) of the third device 463 from the third device.

In operation 502, the intelligence server 460 may establish a third channel with the third device 463. According to an embodiment, the intelligence server 460 may determine an executor device of the second user's utterance as the second device 462 by analyzing the received utterance of the second user through the classifier 471.

In operation 503, the intelligence server 460 may determine whether the third device 463 is located at a periphery of the first device 461, through the device relevance checker 472. According to an embodiment, the periphery of the first device 461 may mean that a device is located within a specific distance from the first device 461. According to an embodiment, when the third device 463 is located in the same room (e.g., in a room) as the first device 461, the intelligence server 460 may determine that the third device 463 is located at a periphery of the first device 461.

When it is determined that the third device 463 is not located at a periphery of the first device 461 in operation 503, in operation 506, the intelligence server 460 may ignore the second user's utterance. According to an embodiment, the intelligence server 460 may transmit, to the third device 463, a message for providing a notification that it is impossible to process the second user's utterance. The third device 463 may display the message.

When it is determined that the third device 463 is located at a periphery of the first device 461 in operation 503, in operation 504, the intelligence server 460 may determine whether the second user's utterance is associated with the first user's utterance received from the first device 461, through the dialogue relevance checker 473. According to an embodiment, when a domain based on a user's intent grasped from the utterance of the second user is the same as a domain based on a user's intent grasped from the utterance of the first user, the intelligence server 460 may determine that the second user's utterance is associated with the first user's utterance.

When it is determined that the second user's utterance is not associated with the first user's utterance in operation 504, in operation 506, the intelligence server 460 may ignore the second user's utterance. According to an embodiment, the intelligence server 460 may transmit, to the third device 463, a message for providing a notification that it is impossible to process the second user's utterance. The third device 463 may display the message.

When it is determined that the second user's utterance is associated with the first user's utterance in operation 504, the intelligence server 460 may identify the type of the second device 462, which is an executor device, through the executor type checker 474. According to an embodiment, the intelligence server 460 may determine whether the type of the second device 462 is a shareable type of a device. According to an embodiment, when the second device 462 corresponds to a speaker, a TV, a monitor, a refrigerator, an air purifier, an air conditioner, a smart window, a smart lighting, or the like, the intelligence server 460 may determine that the type of the second device 462 is the type of a device capable of being shared with a plurality of users. According to an embodiment, when the second device 462 corresponds to a smartphone, a tablet, a smart watch, or the like, the intelligence server 460 may determine that the type of the second device 462 is a type of device incapable of being shared with a plurality of users.

When it is determined that the second device 462 is a device that is incapable of being shared with a plurality of users in operation 505, in operation 506, the intelligence server 460 may ignore the second user's utterance. According to an embodiment, the intelligence server 460 may transmit, to the third device 463, a message for providing a notification that it is impossible to process the second user's utterance. The third device 463 may display the message.

When it is determined that the second device 462 is a device that is capable of being shared with a plurality of users in operation 505, in operation 507, the intelligence server 460 may identify the shared authority of a capsule, in which a dialogue currently goes on, through a capsule authority checker 481 of the multi-user manager 475. According to an embodiment, the intelligence server 460 may identify the shared authority of a capsule corresponding to the first user utterance. According to an embodiment, information about the shared authority of the capsule may be defined in capsule information about an executor device. According to an embodiment, the capsule authority checker 481 of the multi-user manager 475 may determine a domain corresponding to a user's intent by grasping the user's intent based on the first user utterance. According to an embodiment, the multi-user manager 475 may identify information about the shared authority of a capsule included in a capsule 493 by accessing the first concept action network 491 corresponding to the determined domain. According to an embodiment, when there are a plurality of capsules included in the first concept action network 491, a capsule suitable for the user's intent may be determined through a capsule classifier 492.

According to an embodiment, the information about the shared authority of a capsule may include one authority among not sharing, sharing between family members, sharing between specific users, and unlimited sharing depending on the user's settings. According to an embodiment, as the security level of a domain corresponding to the capsule is high, the shared authority range of the capsule may be narrow. For example, when a domain corresponding to the capsule corresponds to an application (e.g., a message application, a gallery application, an email application, or the like), of which sharing is not allowed, the shared authority of the corresponding capsule may be limited to the corresponding user.

For example, when a domain corresponding to the capsule corresponds to an application (e.g., an Internet application, a camera application, a music playback application, or the like), of which sharing is allowed, the sharing of the corresponding capsule may be allowed to all users. According to an embodiment, the sharing range of an application (or a domain) may be set by the user's settings.

In operation 508, the intelligence server 460 may determine whether the second user has authority to use a capsule, through a user authority checker 482 of the multi-user manager 475. According to an embodiment, the intelligence server 460 may compare account information of the second user with account information of the first user, and thus may determine whether the second user is the same as the first user, whether the second user belongs to a family group, whether the second user is included in a specific group, or whether the second user is an unrelated user. According to an embodiment, the user authority checker 482 may determine the account of the second user based on the voice of an utterance. According to an embodiment, the intelligence server 460 may determine whether the second user has authority to use a capsule, based on a result of determining an account of the second user and the shared authority of the capsule.

For example, when the shared authority of a capsule corresponding to the first user's utterance identified through the capsule authority checker 481 is limited to a user included in a family group, and the second user identified through the user authority checker 482 is included in a family group of the first user, the intelligence server 460 may determine that the second user has authority to use the capsule.

For example, when the shared authority of a capsule corresponding to the first user's utterance identified through the capsule authority checker 481 is limited to the corresponding user, and the second user identified through the user authority checker 482 is the same as the first user, the intelligence server 460 may determine that the second user has authority to use the capsule.

For example, when the shared authority of a capsule corresponding to the first user's utterance identified through the capsule authority checker 481 is limited to a user included in a specific group (e.g., a group set by the first user such that sharing is allowed), and the second user identified through the user authority checker 482 is a user included in the specific group, the intelligence server 460 may determine that the second user has authority to use the capsule.

For example, when the shared authority of a capsule corresponding to the first user's utterance identified through the capsule authority checker 481 is allowed to a user included in the family group, and the second user identified through the user authority checker 482 is the same as the first user, the intelligence server 460 may determine that the second user has authority to use the capsule.

For example, when a range of the shared authority of a capsule corresponding to the first user's utterance identified through the capsule authority checker 481 is not limited, the intelligence server 460 may determine that the second user has authority to use the capsule regardless of a group of the second user identified through the user authority checker 482.

For example, when the sharing of a capsule corresponding to the first user's utterance identified through the capsule authority checker 481 is allowed to a user included in a specific group (e.g., a group set by the first user such that sharing is allowed), and the second user identified through the user authority checker 482 is the first user, a user belonging to the first user's family group, or a user included in a specific group, the intelligence server 460 may determine that the second user has authority to use the capsule.

When it is determined that the second user does not have authority to use the capsule in operation 508, in operation 506, the intelligence server 460 may ignore the second user's utterance. According to an embodiment, the intelligence server 460 may transmit, to the third device 463, a message for providing a notification that it is impossible to process the second user's utterance. The third device 463 may display the message.

When it is determined that the second user has authority to use the capsule in operation 508, in operation 509, the intelligence server 460 may communicatively connect the third device 463 to the second device 462 through a channel linker 483 of the multi-channel manager 476. For example, the channel linker 483 of the intelligence server 460 may deliver an input value, which is received by the intelligence server 460 from the third device 463 through the third channel, to the second device 462 through the second channel.

According to an embodiment, before the intelligence server 460 communicatively connects the third device 463 to the second device 462, the intelligence server 460 may form a user interface for receiving information about whether the third device 463 is communicatively connected to the second device 462, and may transmit the information to the first device 461. The first device 461 may display a user interface for receiving the information about whether the third device 463 is communicatively connected to the second device 462, and may receive a connection permission input from the first user. When receiving the connection permission input, the first device 461 may transmit a message including information about the connection permission input to the intelligence server 460. When receiving the message, the intelligence server 460 may communicatively connect the third device 463 to the second device 462.

In operation 510, the intelligence server 460 may generate a user interface (UI) corresponding to a result of processing the second user's utterance through a UI generator 484 of the multi-channel manager 476. According to an embodiment, the UI may include at least one of a visual UI and a voice UI. According to an embodiment, the UI may include a UI indicating that the third device 463 has participated in a conversation between the first device 461 and the second device 462. According to an embodiment, the intelligence server 460 may form a first UI corresponding to the first device 461. According to an embodiment, the intelligence server 460 may form a second UI corresponding to the second device 462. According to an embodiment, the intelligence server 460 may form a third UI corresponding to the third device 463.

In operation 511, the intelligence server 460 may transmit a response including a UI to each device through the IoT server 467 by means of a response manager 485 of the multi-channel manager 476. According to an embodiment, the response may further include a result of processing an utterance received from each device. According to an embodiment, the response manager 485 of the multi-channel manager 476 may distribute UIs to be output by each device and may respectively deliver the UIs to devices through the IoT server 467. According to an embodiment, the intelligence server 460 may transmit the first UI to the first device 461. According to an embodiment, the intelligence server 460 may transmit the second UI to the second device 462. According to an embodiment, the intelligence server 460 may transmit the third UI to the third device 463. According to an embodiment, the IoT server 467 may transmit the first UI received from the intelligence server 460 to the first device 461, may transmit the second UI to the second device 462, and may transmit the third UI to the third device 463.

According to an embodiment, in operation 512, the first device 461 receiving the first UI may output the first UI through the output interface (e.g., a display device, a speaker, or the like) of the first device 461. According to an embodiment, in operation 513, the second device 462 receiving the second UI may output the second UI through the output interface (e.g., a display device, a speaker, or the like) of the second device 462. According to an embodiment, in operation 514, the third device 463 receiving the third UI may output the third UI through the output interface (e.g., a display device, a speaker, or the like) of the third device 463.

According to various embodiments, some of the configurations and/or operations described above with reference to FIGS. 4 and 5 may be omitted or may be performed while being integrated.

Hereinafter, operations of electronic devices according to an embodiment will be described with reference to FIGS. 6 and 7.

Figure 6:
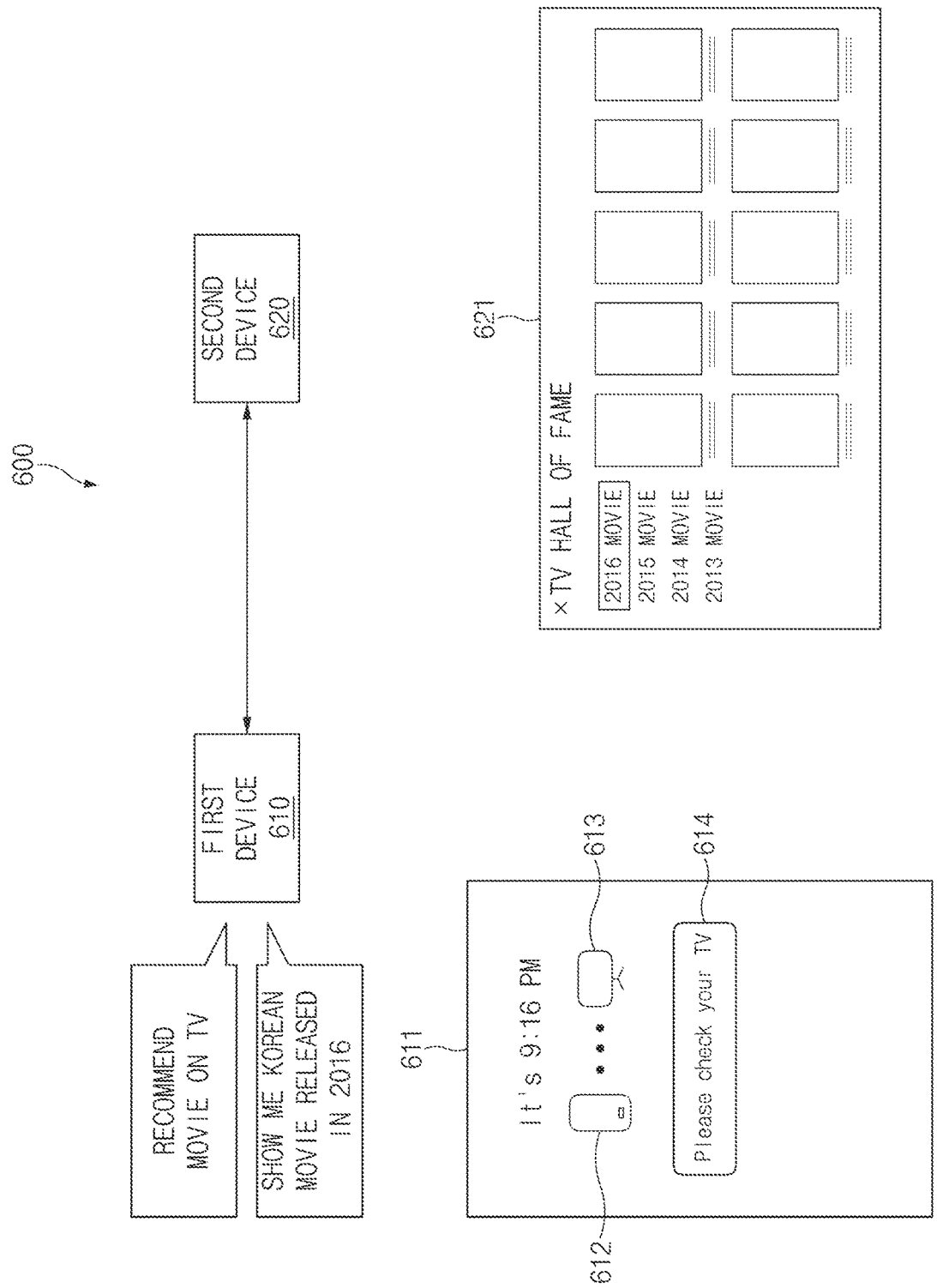
FIG. 6 is a diagram for describing operations of electronic devices according to an embodiment of the disclosure.

FIG. 6 is a diagram 600 for describing operations of electronic devices according to an embodiment. FIG. 7 is a diagram 700 for describing operations of electronic devices according to an embodiment. With regard to configurations identical to the configurations of the embodiment described above, additional description will be omitted to avoid redundancy.

Referring to FIG. 6, according to an embodiment, a first device 610 may correspond to the user terminal 100 of FIG. 1. The first device 610 may receive an utterance of a first user through a voice input device. For example, the first device 610 may receive the utterance of the first user, such as "recommend a movie on TV" or "show me a Korean movie released in 2016". The first device 610 may transmit the received utterance of the first user to an intelligence server (not shown) (e.g., the intelligence server 460 of FIG. 4). As an executor device corresponding to user intent according to a result of processing the first user's utterance by the intelligence server is determined as a second device 620, the first device 610 and the second device 620 may be connected to each other through the intelligence server. According to an embodiment, the second device 620 may be an electronic device configured to be controlled based on a signal from the intelligence server, an IoT server, and/or the first device 610. The processing result of a plan generated based on the utterance of the first user may be transmitted to the second device 620 by the intelligence server.

According to an embodiment, a first screen 611 may be displayed on a display device of the first device 610. The first screen 611 may indicate that the first device 610 and the second device 620 are connected to each other, by including a first UI 612 corresponding to the first device 610 and a second UI 613 corresponding to the second device 620. According to an embodiment, the first screen 611 may include a notification UI 614 indicating that the processing result of the plan generated based on the utterance of the first user was performed by the second device 620. According to an embodiment, the first user utterance processing result including a UI, which is displayed on the first screen 611, may be received from the intelligence server.

According to an embodiment, a second screen 621 may be displayed on a display device of the second device 620. The processing result of the plan generated based on the utterance of the first user may be displayed on the second screen 621. For example, when the first user's utterance is "recommend a movie on TV" or "show me a Korean movie released in 2016", the second device 620 may provide a user with recommended movies among movies released in 2016. According to an embodiment, the first user utterance processing result including a UI, which is displayed on the second screen 621, may be received from the intelligence server.

Figure 7:
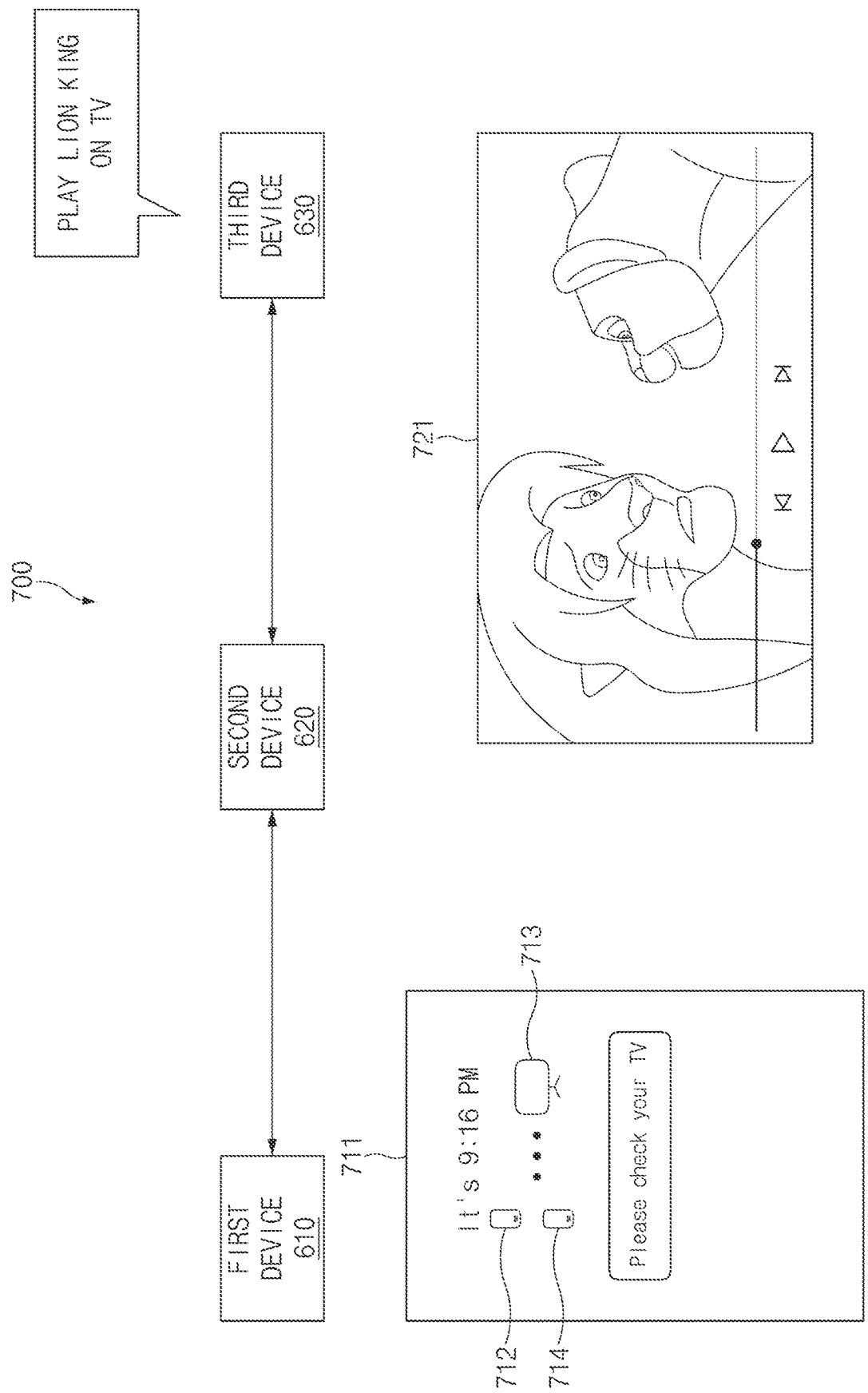
FIG. 7 is a diagram for describing operations of electronic devices according to an embodiment of the disclosure.

Referring to FIG. 7, while the first device 610 and the second device 620 are connected to each other through the intelligence server (not shown), a third device 630 may receive the utterance of the second user through a voice input device. According to an embodiment, the third device 630 may correspond to the user terminal 100 of FIG. 1. For example, the third device 630 may receive the utterance of the second user, such as "play Lion King on a TV". The third device 630 may transmit the received utterance of the first user to an intelligence server (not shown) (e.g., the intelligence server 460 of FIG. 4).

According to an embodiment, the intelligence server may determine an executor device as the second device 620 by analyzing the utterance of the second user received from the third device 630. As it is determined that an executor device of the third device 630 is the second device 620 that is the same as the executor device of the first device 610, the intelligence server may determine whether the third device 630 is located within a specific distance from the first device 610. When it is determined that the third device 630 is within a specific distance of the first device 610, the intelligence server may determine whether the second user's utterance is associated with the first user's utterance received from the first device 610. For example, the intelligence server may determine that a domain based on the user's intent grasped from the second user's utterance is a video execution application. The domain based on the user's intent may be the same as a domain based on the first user's utterance. Accordingly, the intelligence server may determine that the utterance of the second user is associated with the utterance of the first user.

When it is determined that the second user's utterance is associated with the first user's utterance, the intelligence server may identify the type of the second device 620, which is an executor device. For example, as the type of the second device 620 corresponds to a TV, the intelligence server may determine that the second device 620 is a shareable device. When determining that the second device 620 is a device that is capable of being shared with a plurality of users, the intelligence server may identify the shared authority of the capsule corresponding to the first user utterance. According to an embodiment, the intelligence server may access a first concept action network corresponding to a domain of the first user's utterance and then may identify information about the shared authority of a capsule included in the capsule. For example, as a domain of a capsule including an operation of recommending a movie is a video playback application, the intelligence server may identify that the shared authority of the capsule is all users.

According to an embodiment, the intelligence server may determine whether the second user has authority to use a capsule. According to an embodiment, the intelligence server may grasp an account based on the second user's voice, may compare account information of the first user with information about the grasped account, and may determine whether the first user is the same as the second user, whether the second user belongs to a family group, whether the second user is included in a specific group, or whether the second user is an unrelated user. For example, the intelligence server may identify that the second user's account is an account included in the first user's family group. As the shared authority of a capsule corresponds to all users, the intelligence server may determine that the second user has authority to use the capsule. When determining that the second user has authority to use the capsule, the intelligence server may connect the third device 630 to the second device 620. Accordingly, the third device 630 may have a conversation with the first device 610 and the second device 620 at the same time. As the third device 630 is also connected to the second device 620, the processing result of a plan generated based on the utterance of the second user may be transmitted to the second device 620 by the intelligence server.

According to an embodiment, a third screen 711 may be displayed on a display device of the first device 610. The third screen 711 may indicate that the first device 610 and the third device 630 are connected to the second device 620 at the same time, by including a first UI 712 corresponding to the first device 610, a second UI 713 corresponding to the second device 620, and a third UI 714 corresponding to the third device 630. According to an embodiment, the second user utterance processing result including a UI, which is displayed on the third screen 711, may be received from the intelligence server.

According to an embodiment, a fourth screen 721 may be displayed on a display device of the second device 620. The fourth screen 721 may display the processing result of the plan generated based on the utterance of the second user. For example, when the utterance of the second user is "play Lion King on a TV", the second device 620 may play a movie of "Lion King." According to an embodiment, the second user utterance processing result including a UI, which is displayed on the fourth screen 721, may be received from the intelligence server.

Hereinafter, operations of electronic devices according to an embodiment will be described with reference to FIGS. 8 and 9.

Figure 8:
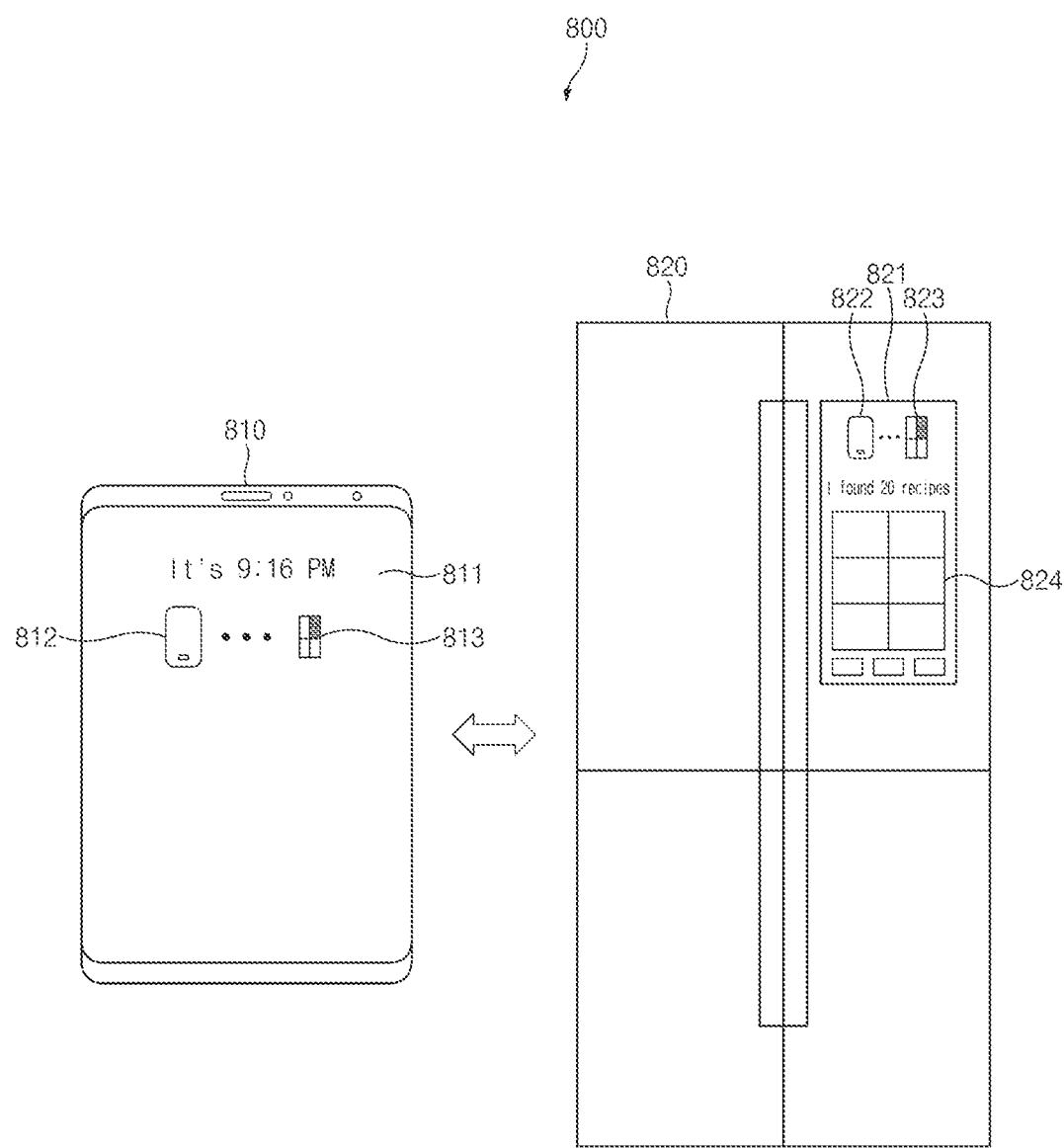
FIG. 8 is a diagram for describing operations of electronic devices according to an embodiment of the disclosure.

FIG. 8 is a diagram 800 for describing operations of electronic devices according to an embodiment. FIG. 9 is a diagram 900 for describing operations of electronic devices according to an embodiment. With regard to configurations identical to the configurations of the embodiment described above, additional description will be omitted to avoid redundancy.

Referring to FIG. 8, according to an embodiment, a first device 810 may correspond to the user terminal 100 of FIG. 1. The first device 810 may receive a first utterance of a first user through a voice input device. For example, the first device 810 may receive the first utterance of the first user, such as "show me a recipe for making a pizza on a refrigerator". The first device 810 may transmit the received first utterance of the first user to an intelligence server (not shown) (e.g., the intelligence server 460 of FIG. 4). As an executor device corresponding to user intent according to a result of processing the first utterance of the first user by the intelligence server is determined as a second device 820, the first device 810 and the second device 820 may be connected to each other through the intelligence server. The processing result of a plan generated based on the first utterance of the first user may be transmitted to the second device 820 by the intelligence server.

According to an embodiment, a first screen 811 may be displayed on a display device of the first device 810. The first screen 811 may indicate that the first device 810 and the second device 820 are connected to each other, by including a first UI 812 corresponding to the first device 810 and a second UI 813 corresponding to the second device 820. According to an embodiment, a processing result of the first utterance of the first user including a UI, which is displayed on the first screen 811, may be received from the intelligence server.

According to an embodiment, a second screen 821 may be displayed on a display device of the second device 820. According to an embodiment, the second screen 821 may indicate that the first device 810 and the second device 820 are connected to each other, by including a first UI 822 corresponding to the first device 810 and a second UI 823 corresponding to the second device 820. According to an embodiment, the processing result of the plan generated based on the first utterance of the first user may be displayed on the second screen 821. For example, when the first utterance of the first user is "show me a recipe for making a pizza on a refrigerator", the second device 820 may provide a recipe 824 for pizza to a user. According to an embodiment, a processing result of the first utterance of the first user including a UI, which is displayed on the second screen 821, may be received from the intelligence server.

According to an embodiment, the first user may move to a periphery of the second device 820. Alternatively, a new second user may enter a second utterance into the second device 820. For example, the second device 820 may receive the second utterance, such as "show me a recipe for gorgonzola pizza". The second device 820 may transmit the received second utterance to an intelligence server (not shown) (e.g., the intelligence server 460 of FIG. 4).

According to an embodiment, the intelligence server may determine an executor device as the second device 820 by analyzing the second utterance received from the second device 820. At this time, the second device 820 may be an executor device and a receiving device. As it is determined that an executor device of the second utterance is the second device 620 that is the same as the executor device of the first device 610, the intelligence server may determine whether the second utterance is associated with the first utterance.

For example, the intelligence server may determine that a domain based on the user's intent grasped from the second utterance is a recipe application. The domain based on the user's intent may be the same as a domain based on the first utterance. Accordingly, the intelligence server may determine that the second utterance is associated with the first utterance.

When it is determined that the second user's utterance is associated with the first user's utterance, the intelligence server may identify the shared authority of the capsule corresponding to the first utterance. According to an embodiment, the intelligence server may access a first concept action network corresponding to a domain of the first user's utterance and then may identify information about the shared authority of a capsule included in the capsule. For example, as a domain of a capsule including an operation of recommending a recipe is a recipe application, the intelligence server may identify that the shared authority of the capsule is all users.

According to an embodiment, the intelligence server may determine whether the second utterance has authority to use a capsule. According to an embodiment, the intelligence server may grasp an account based on the voice of the second utterance, may compare account information of the first utterance with information about the grasped account, and may determine whether the grasped account is the same as the first user, whether the grasped account belongs to a family group of the first user, whether the grasped account is included in a specific group, or whether the grasped account is an unrelated with the first user. For example, the intelligence server may identify that the account of the second utterance is same with the account of the first utterance. As the shared authority of a capsule corresponds to all users, the intelligence server may determine that (the account of) the second utterance has authority to use the capsule. When determining that the second utterance has authority to use the capsule, the intelligence server may allow an utterance received from the second device 820 as well as an utterance received from the first device 810 to be performed by the second device 820, by simultaneously using the second device 820 and the first device 810 as receiving devices. As the second device 820 is set as a receiving device, the processing result of a plan generated based on the second utterance may be transmitted to the second device 820 by the intelligence server.

Figure 9:
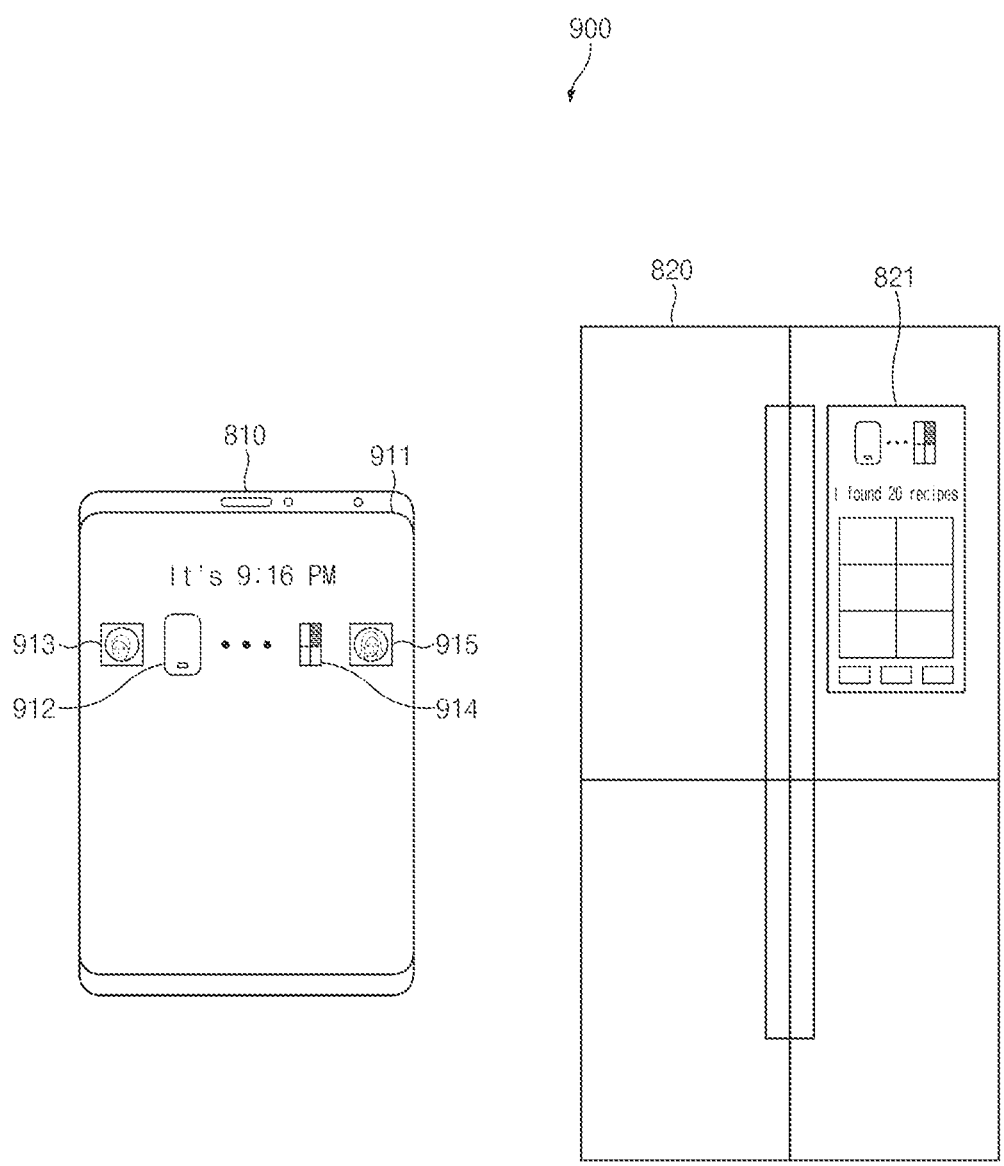
FIG. 9 is a diagram for describing operations of electronic devices according to an embodiment of the disclosure.

Referring to FIG. 9, according to an embodiment, the intelligence server may determine that an account identified based on the voice of the second utterance is different from account information of the first utterance, but is an account of a the second user included in a specific group set by the first user. The intelligence server may identify that the account of the second utterance is an account included in a specific group set by the first user. As the shared authority of a capsule corresponds to all users, the intelligence server may determine that the account of the second utterance has authority to use the capsule. When determining that the second utterance has authority to use the capsule, the intelligence server may allow an utterance received from the second device 820 as well as an utterance received from the first device 810 to be performed by the second device 820, by simultaneously using the second device 820 and the first device 810 as receiving devices. As the second device 820 is set as a receiving device, the processing result of a plan generated based on the second utterance may be transmitted to the second device 820 by the intelligence server.

According to an embodiment, a third screen 911 may be displayed on a display device of the first device 810. The third screen 911 may indicate that the first device 810 and the second device 820 are connected to each other, by including a first UI 912 corresponding to the first device 810, a UI 913 corresponding to the first user, a second UI 914 corresponding to the second device 820, and a UI 915 corresponding to the second user. According to an embodiment, a processing result of the first utterance of the first user including a UI, which is displayed on the third screen 911, may be received from the intelligence server.

Hereinafter, operations of electronic devices according to an embodiment will be described with reference to FIG. 10.

Figure 10:
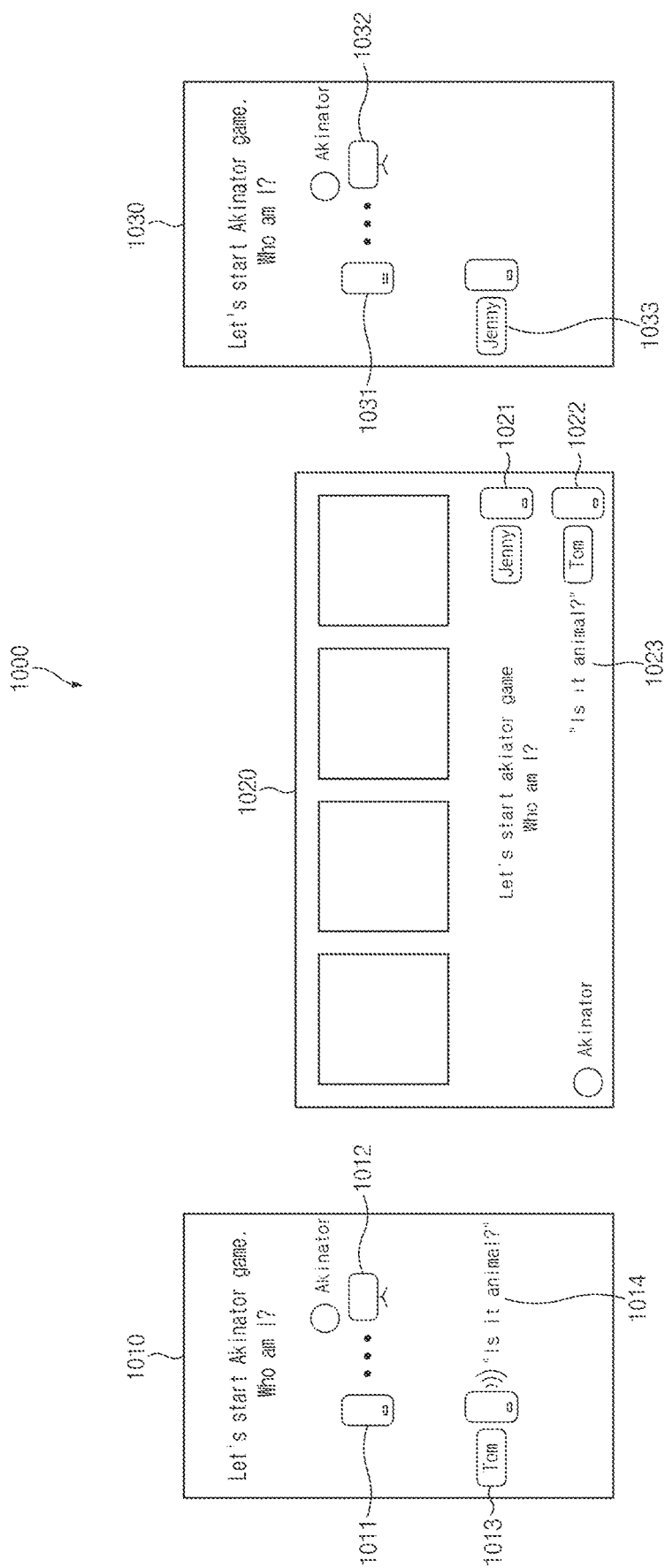
FIG. 10 is a diagram for describing operations of electronic devices according to an embodiment of the disclosure.

FIG. 10 is a diagram 1000 for describing operations of electronic devices according to an embodiment. With regard to configurations identical to the configurations of the embodiment described above, additional description will be omitted to avoid redundancy.

Referring to FIG. 10, according to an embodiment, a first device 1010 may correspond to the user terminal 100 of FIG. 1. The first device 1010 may receive a first utterance of a first user through a voice input device. For example, the first device 1010 may receive the first utterance of the first user, such as "start Akinator on a TV". The first device 1010 may transmit the received first utterance of the first user to an intelligence server (not shown) (e.g., the intelligence server 460 of FIG. 4). As an executor device corresponding to user intent according to a result of processing the first utterance of the first user by the intelligence server is determined as a second device 1020 (e.g., TV), the first device 1010 and the second device 1020 may be connected to each other through the intelligence server. The processing result of a plan generated based on the first utterance of the first user may be transmitted to the second device 1020 by the intelligence server.

According to an embodiment, the second user may enter a second utterance into a third device 1030. According to an embodiment, the third device 1030 may correspond to the user terminal 100 of FIG. 1. For example, the third device 1030 may receive the second utterance, such as "is it an animal?" The third device 1030 may transmit the received second utterance to an intelligence server (not shown) (e.g., the intelligence server 460 of FIG. 4).

According to an embodiment, the intelligence server may determine an executor device as the second device 1020 by analyzing the utterance of the second user received from the third device 1030. As it is determined that an executor device of the third device 1030 is the second device 1020 that is the same as the executor device of the first device 1010, the intelligence server may determine whether the third device 1030 is located within a specific distance from the first device 1010. When it is determined that the third device 1030 is within a specific distance of the first device 1010, the intelligence server may determine whether the second user's utterance is associated with the first user's utterance received from the first device 1010. For example, the intelligence server may determine that a domain based on the user's intent grasped from the second user's utterance is an Akinator game application. The domain based on the user's intent may be the same as a domain based on the first user's utterance. Accordingly, the intelligence server may determine that the utterance of the second user is associated with the utterance of the first user.

When it is determined that the second user's utterance is associated with the first user's utterance, the intelligence server may identify the type of the second device 1020, which is an executor device. For example, as the type of the second device 1020 corresponds to a TV, the intelligence server may determine that the second device 620 is a shareable device. When determining that the second device 1020 is a device that is capable of being shared with a plurality of users, the intelligence server may identify the shared authority of the capsule corresponding to the first user utterance. According to an embodiment, the intelligence server may access a first concept action network corresponding to a domain of the first user's utterance and then may identify information about the shared authority of a capsule included in the capsule. For example, as a domain of a capsule including an Akinator game operation is a game application, the intelligence server may identify that the shared authority of the capsule corresponds to all users.

According to an embodiment, the intelligence server may determine whether the second user has authority to use a capsule. According to an embodiment, the intelligence server may grasp an account based on the second user's voice, may compare account information of the first user with information about the grasped account, and may determine whether the grasped account is the same as the first user, whether the grasped account belongs to a family group of the first user, whether the grasped account is included in a specific group, or whether the grasped account is an unrelated with the first user. For example, the intelligence server may identify that the second user's account is an account included in the first user's family group. As the shared authority of a capsule corresponds to all users, the intelligence server may determine that the second user has authority to use the capsule. When determining that the second user has authority to use the capsule, the intelligence server may connect the third device 1030 to the second device 1020. Accordingly, the third device 1030 may have a conversation with the first device 1010 and the second device 1020 at the same time. As the third device 1030 is also connected to the second device 1020, the processing result of a plan generated based on the utterance of the second user may be transmitted to the second device 1020 by the intelligence server.

According to an embodiment, a first screen may be displayed on a display device of the first device 1010. According to one embodiment, the first screen may indicate that the third device 1030 has participated in an Akinator game performed by the first device 1010 through the second device 1020, by including a UI 1011 corresponding to the first device 1010, a UI 1012 corresponding to the second device 1020, and a UI 1013 corresponding to the third device 1030. According to an embodiment, the first screen may include information 1014 (e.g., "is it an animal?") in the second user's utterance. According to an embodiment, an utterance processing result including a UI, which is displayed on the first screen, may be received from the intelligence server.

According to an embodiment, a second screen may be displayed on a display device of the second device 1020. According to one embodiment, the second screen may indicate that the third device 1030 has participated in an Akinator game performed by the first device 1010 through the second device 1020, by including a UI 1021 corresponding to the first device 1010 and a UI 1022 corresponding to the third device 1030. According to an embodiment, the second screen may include information 1023 (e.g., "is it an animal?") in the second user's utterance. According to an embodiment, an utterance processing result including a UI, which is displayed on the second screen, may be received from the intelligence server.

According to an embodiment, a third screen may be displayed on a display device of the third device 1030. According to one embodiment, the third screen may indicate that the third device 1030 has participated in an Akinator game performed by the first device 1010 through the second device 1020, by including a UI 1031 corresponding to the first device 1010, a UI 1032 corresponding to the second device 1020, and a UI 1033 corresponding to the third device 1030. According to an embodiment, an utterance processing result including a UI, which is displayed on the third screen, may be received from the intelligence server.

According to an embodiment of the disclosure, an electronic device may include a voice input device, a communication circuit, a display, a processor operatively connected to the voice input device, the communication circuit, and the display, and a memory operatively connected to the processor. The memory may store one or more instructions that, when executed, cause the processor to receive a first utterance from a first user through the voice input device, to communicatively connect to a first external electronic device based on the first utterance, to display, to the display, a first user interface indicating a state of communicatively connecting to the first external electronic device, and to display, to the display, a second user interface indicating that the electronic device and the second external electronic device are simultaneously connected to the first external electronic device when the first external electronic device is communicatively connected to a second external electronic device.

According to an embodiment of the disclosure, when the electronic device is communicatively connected to the first external electronic device, an account of a second user that is a user of the second external electronic device may be an account for which communicative connection to the first external electronic device is allowed.

According to an embodiment of the disclosure, the account of the second user may be identical to an account of the first user or an account included in a group set by the first user.

According to an embodiment of the disclosure, sharing of the first external electronic device may be allowed to a user in a specific range, and the specific range may be set by the first user.

According to an embodiment of the disclosure, the second external electronic device may be located within a specific distance of the electronic device.

According to an embodiment of the disclosure, a domain according to intent of a user identified from a second utterance of a second user received through the second external electronic device may be identical to a domain according to intent of a user identified from the first utterance.

According to an embodiment of the disclosure, sharing of a capsule corresponding to a domain according to intent of a user identified from the first utterance of the first user may be allowed to a user in a specific range, and the specific range may be set by the first user.

According to an embodiment of the disclosure, an account of a second user that is a user of the second external electronic device may be included in the specific range.

According to an embodiment of the disclosure, the memory may store instructions that, when executed, cause the processor to display a third user interface indicating a result obtained by performing a task based on a second utterance received through the second external electronic device, on the display.

According to an embodiment of the disclosure, the memory may store instructions that, when executed, cause the processor to display a third user interface for receiving information about whether the first external electronic device is communicatively connected to the second external electronic device, on the display before the second user interface is displayed.

According to an embodiment of the disclosure, a method for controlling an external electronic device based on voice may include receiving a first utterance from a first user through a voice input device of an electronic device, communicatively connecting to a first external electronic device based on the first utterance, displaying, to a display of the electronic device, a first user interface indicating a state of communicatively connecting to the first external electronic device, and displaying, to the display, a second user interface indicating that the electronic device and the second external electronic device are simultaneously connected to the first external electronic device when the first external electronic device is communicatively connected to a second external electronic device.

According to an embodiment of the disclosure, when the electronic device is communicatively connected to the first external electronic device, an account of a second user that is a user of the second external electronic device may be an account for which communicative connection to the first external electronic device is allowed.

According to an embodiment of the disclosure, the account of the second user may be identical to an account of the first user or an account included in a group set by the first user.

According to an embodiment of the disclosure, sharing of the first external electronic device may be allowed to a user in a specific range, and the specific range may be set by the first user.

According to an embodiment of the disclosure, the second external electronic device may be located within a specific distance of the electronic device.

According to an embodiment of the disclosure, a domain according to intent of a user identified from a second utterance of a second user received through the second external electronic device may be identical to a domain according to intent of a user identified from the first utterance.

According to an embodiment of the disclosure, sharing of a capsule corresponding to a domain according to intent of a user identified from the first utterance of the first user may be allowed to a user in a specific range, and the specific range may be set by the first user.

According to an embodiment of the disclosure, an account of a second user that is a user of the second external electronic device may be included in the specific range.

According to an embodiment of the disclosure, the method may further include displaying a third user interface indicating a result obtained by performing a task based on a second utterance received through the second external electronic device, on the display.

According to an embodiment of the disclosure, the method may further include displaying a third user interface for receiving information about whether the first external electronic device is communicatively connected to the second external electronic device, on the display before the second user interface is displayed.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   a voice input device;
   a communication circuit;
   a display;
   memory storing one or more computer programs; and
   one or more processors communicatively coupled to the voice input device, the communication circuit, the display, and the memory,
   wherein the one or more computer programs include computer-executable instructions that, when executed by the one or more processors, cause the electronic device to:
      receive a first utterance from a first user through the voice input device,
      based on the first utterance, communicatively connect to a first external electronic device,
      control the display to display a first screen indicating a state of communicatively connecting the electronic device to the first external electronic device, the first screen including a first user interface corresponding to the electronic device being indicated as being in the state of communicatively connecting to a second user interface corresponding to the first external electronic device, and
      based on the first external electronic device being communicatively connected to a second external electronic device, control the display to display a second screen indicating that the electronic device and the second external electronic device are simultaneously connected to the first external electronic device, the second screen including the first user interface corresponding to the electronic device and a third user interface corresponding to the second external electronic device being indicated as being in the state of being communicatively connected to the second user interface corresponding to the first external electronic device.

2. The electronic device of claim 1, wherein, based on the electronic device being communicatively connected to the first external electronic device, an account of a second user using the second external electronic device is an account for which communicative connection to the first external electronic device is allowed.

3. The electronic device of claim 2, wherein the account of the second user is identical to an account of the first user or an account included in a group set by the first user.

4. The electronic device of claim 1,
   wherein sharing of the first external electronic device is allowed to a user in a specific range, and
   wherein the specific range is set by the first user.

5. The electronic device of claim 1, wherein the second external electronic device is located within a specific distance of the electronic device.

6. The electronic device of claim 1, wherein a domain according to an intent of a user identified from a second utterance of a second user received through the second external electronic device is identical to a domain according to an intent of a user identified from the first utterance.

7. The electronic device of claim 1,
   wherein sharing of a capsule corresponding to a domain according to an intent of a user identified from the first utterance of the first user is allowed to another user in a specific range, and
   wherein the specific range is set by the first user.

8. The electronic device of claim 7, wherein an account of a second user that is a user of the second external electronic device is included in the specific range.

9. The electronic device of claim 1, wherein the one or more computer programs further include computer-executable instructions that, when executed by the one or more processors, cause the electronic device to:
   control the display to display a user interface indicating a result obtained by performing a task based on a second utterance received through the second external electronic device.

10. The electronic device of claim 1, wherein the one or more computer programs further include computer-executable instructions that, when executed by the one or more processors, cause the electronic device to:
    before displaying the second screen, control the display to display a user interface for receiving information about whether the first external electronic device is communicatively connected to the second external electronic device.

11. A method performed by an electronic device for controlling an external electronic device based on voice, the method comprising:
    receiving, by the electronic device, a first utterance from a first user through a voice input device of the electronic device;
    based on the first utterance, communicatively connecting, by the electronic device, to a first external electronic device;
    displaying, by the electronic device on a display of the electronic device, a first screen indicating a state of communicatively connecting the electronic device to the first external electronic device, the first screen including a first user interface corresponding to the electronic device being indicated as being in the state of communicatively connecting to a second user interface corresponding to the first external electronic device; and
    based on the first external electronic device being communicatively connected to a second external electronic device, displaying, by the electronic device on the display, a second screen indicating that the electronic device and the second external electronic device are simultaneously connected to the first external electronic device, the second screen including the first user interface corresponding to the electronic device and a third user interface corresponding to the second external electronic device being indicated as being in the state of being communicatively connected to the second user interface corresponding to the first external electronic device.

12. The method of claim 11, wherein, when based on the electronic device being communicatively connected to the first external electronic device, an account of a second user using the second external electronic device is an account for which communicative connection to the first external electronic device is allowed.

13. The method of claim 12, wherein the account of the second user is identical to an account of the first user or an account included in a group set by the first user.

14. The method of claim 11,
    wherein sharing of the first external electronic device is allowed to a user in a specific range, and
    wherein the specific range is set by the first user.

15. The method of claim 11, wherein the second external electronic device is located within a specific distance of the electronic device.

16. The method of claim 11, wherein a domain according to an intent of a user identified from a second utterance of a second user received through the second external electronic device is identical to a domain according to an intent of a user identified from the first utterance.

17. The method of claim 11,
wherein sharing of a capsule corresponding to a domain according to an intent of a user identified from the first utterance of the first user is allowed to another user in a specific range, and
wherein the specific range is set by the first user.

18. The method of claim 17, wherein an account of a second user that is a user of the second external electronic device is included in the specific range.

19. The method of claim 11, further comprising:
displaying, by the electronic device on the display, a user interface indicating a result obtained by performing a task based on a second utterance received through the second external electronic device.

20. The method of claim 11, further comprising:
before displaying the second screen, displaying, by the electronic device on the display, a user interface for receiving information about whether the first external electronic device is communicatively connected to the second external electronic device.

21. The electronic device of claim 1,
wherein the first user interface comprises a first shape corresponding to the electronic device,
wherein the second user interface comprises a second shape corresponding to the first external electronic device and being different from the first shape, and
wherein the third user interface comprises a third shape corresponding to the second external electronic device and being different from the second shape.

* * * * *